United States Patent [19]

Shannon

[11] Patent Number: 5,028,185
[45] Date of Patent: Jul. 2, 1991

[54] LOAD SECURING SYSTEM

[76] Inventor: Phillip Shannon, 1627 Ridge Avenue, Florence, Ala. 35630

[21] Appl. No.: 524,013

[22] Filed: May 16, 1990

[51] Int. Cl.⁵ .............................................. B66D 45/00
[52] U.S. Cl. .................................... 410/151; 410/127; 410/121; 410/143; 410/145
[58] Field of Search ............... 410/121, 127, 128, 129, 410/143, 145, 151, 123

[56] References Cited

U.S. PATENT DOCUMENTS

| | | | |
|---|---|---|---|
| 2,565,997 | 8/1951 | Stone | 410/129 |
| 2,974,931 | 3/1961 | Reel et al. | 410/128 |
| 3,699,898 | 10/1972 | Nolan | 410/151 |
| 3,995,565 | 12/1976 | Kersey | 410/151 |
| 4,023,819 | 5/1977 | Holman, Jr. | 410/151 |
| 4,121,849 | 10/1978 | Christopher | 410/123 |
| 4,343,578 | 8/1982 | Barnes | 410/143 |
| 4,449,876 | 5/1984 | Glanton | 410/151 |
| 4,797,043 | 1/1989 | Williams, Jr. | 410/145 |

OTHER PUBLICATIONS

The Book of Cargo Protection, 12 pages, 1986, Bishop-Wisecarver Corporation, Pittsburg, Calif.

Primary Examiner—Joseph F. Peters, Jr.
Assistant Examiner—R. B. Johnson
Attorney, Agent, or Firm—Hugh D. Jaeger

[57] ABSTRACT

A load securing system for securing loads in a trailer or van, whether the load is centered in the nose of the trailer or held in the rear of the trailer. The load securing system includes a longitudinal member, a friction jack adjustably secured at one end, and H-bars on a plate pivotally mounted on the other end. An extension member can engage with the longitudinal member for securing a load in a center position. In an alternative embodiment, at least one friction jack can be utilized and more than one pivotally mounted H-bar plate can be utilized along the length of the longitudinal member.

1 Claim, 12 Drawing Sheets

LOAD SECURING SYSTEM

BACKGROUND OF THE INVENTION

1. Field of the Invention

The present invention relates to a load securing system, and more importantly, pertains to a load securing system for securing cargo, such as cargo on a pallet, in a trailer such as a semi or a van.

2. Description of the Prior Art

Prior art devices have not provided for adjustability, and have not distributed the focal point of the load securing device across the goods to be secured, such as boxes or pallets.

The prior art load securing devices, or better known as cargo securing devices, have utilized a strap or a single small-sized foot, such as a molded rubber foot or a bar. These have not distributed the forces of the cargo securing devices across the box or boxes.

The present invention overcomes the disadvantages of the prior art by providing an H-bar plate or plates configuration for distributing the load securing system over a wide surface area of cargo in a trailer or in a van.

SUMMARY OF THE INVENTION

The general purpose of the present invention is a load securing system, including the use of a longitudinal member with an adjustable friction jack at one end and an H-bar and plate assembly on the other end pivotally mounted to the other end of the longitudinal member. The H-bar and plate can be centered with a longitudinal extension arm. In the alternative, more than one H-bar and plate assembly can be utilized along the length of the longitudinal member and between the friction jack and the foot plate with an extension member.

According to one embodiment of the present invention there is provided a load securing system utilizing a longitudinal member, a friction jack on a threaded rod at one end, and an H-bar and plate pivotally mounted in opposing longitudinal slots of the longitudinal member at the other end. An alternative embodiment includes positioning the H-bars with at least one plate at about the center of the longitudinal member, or using more than one H-bars and plate along the length of the longitudinal member.

Significant aspects and features of the present invention include a load securing system which is adjustable and can be utilized to secure a load at the side of a trailer. Two systems can be used to secure a load at the nose of a trailer. Systems can be utilized to secure an load midway in the trailer.

Another significant aspect and feature of the present invention is a load securing system which is easily operable and readily adjustable for any variation in the size of the pallets, the size of the load, or the width of the trailer or van.

Still another significant aspect and feature of the present invention is a load securing system which is manufactured of readily available components and is structurally stable.

Having thus described the embodiments of the present invention, it is a principal object hereof to provide a load securing system utilizing a friction jack at one end and H-bars and plate at the other end.

One object of the present invention is a load securing system intended for use in large trailers for positioning of single loads either to the side of the trailer or the nose of the trailer, singling out a single load, or positioning two loads side-by-side from falling backwards in a trailer. A load is for example and by way of illustration boxes on a pallet.

Another object of the present invention is a load securing system with H-bars and plate which distributes the load securing system over a wide surface area which is advantageous compared to the prior art which secured a load at a single point such as by ropes or straps.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
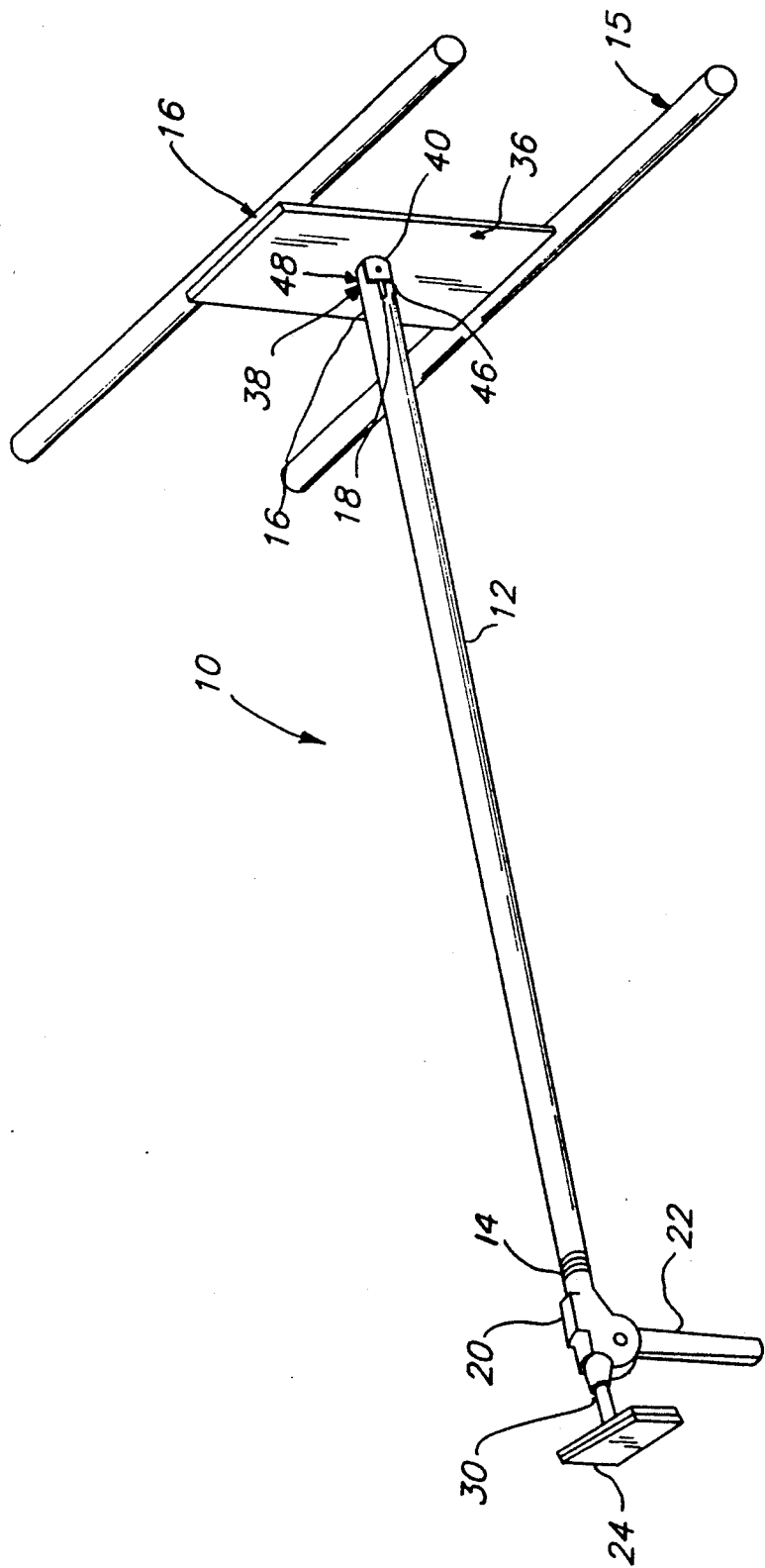
FIG. 1 illustrates a perspective view of a load securing system, the present invention.

FIG. 1 illustrates a perspective view of the load securing system 10, including a longitudinal member 12, a hollow threaded member 14 secured to one end of the longitudinal member 12, and two opposing elongated holes 16 and 18 at the other end of the longitudinal member 12. A friction jack 20 threads onto the hollow threaded member 14, and includes a handle 22 and a rubber foot plate 24 including a socket 26 positioned on a ball joint 28 secured to a rod 30 in the friction jack 20. The rod 30 extends through the hollow threaded member 14. Two opposing bars 32 and 34 are secured to a plate 36 such as by welding or the like. Two opposing tabs 38 and 40 with opposing tab holes 42 and 44 are secured to one side of the plate 36. A bolt 46 with nut 48 secures through the opposing tab holes 42 and 44 and through the opposing elongated holes 16 and 18 for alignment as illustrated in FIG. 2.

Figure 2:
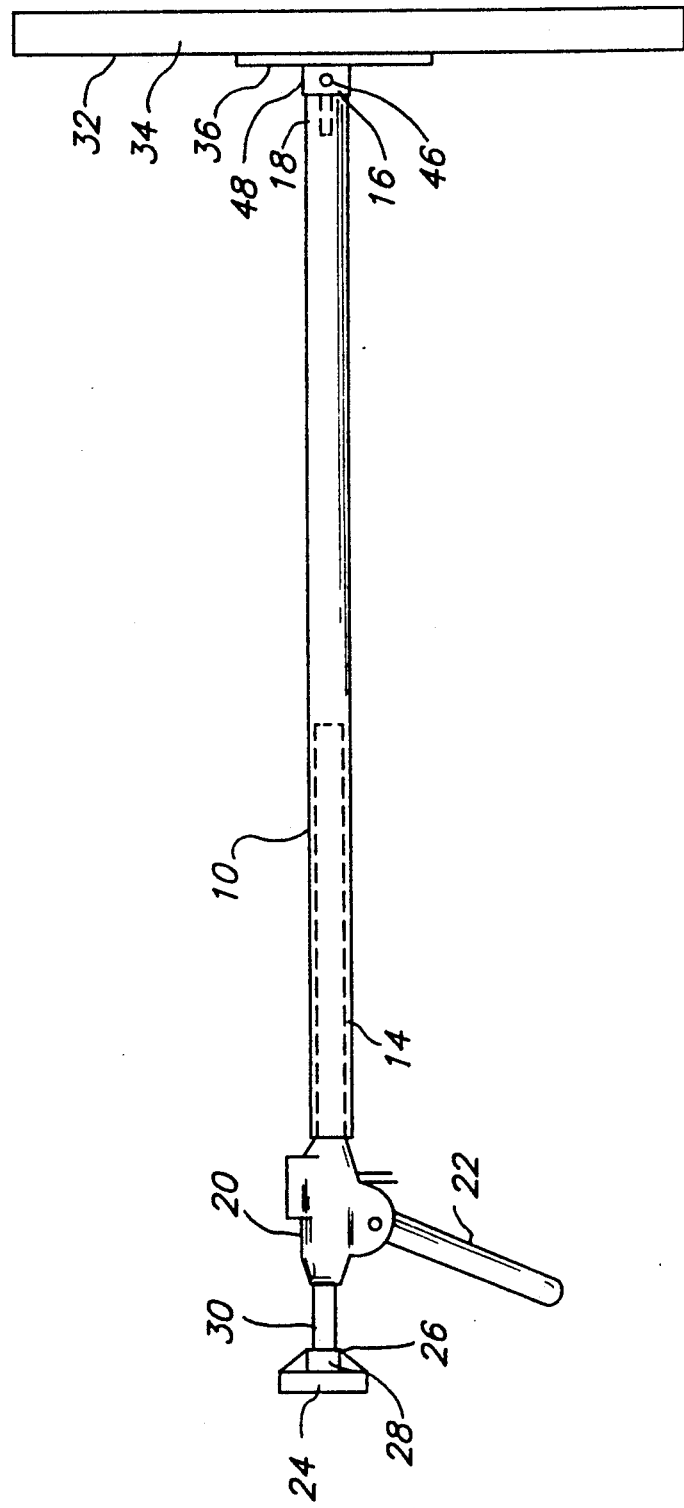
FIG. 2 illustrates a side view of FIG. 1.

FIG. 2 illustrates a side view of the load securing system 10 where all numerals correspond to those elements previously described. Attention is drawn to placement of the bars and the plate forming an "H" configuration.

DESCRIPTION OF THE FIRST ALTERNATIVE EMBODIMENT

Figure 3:
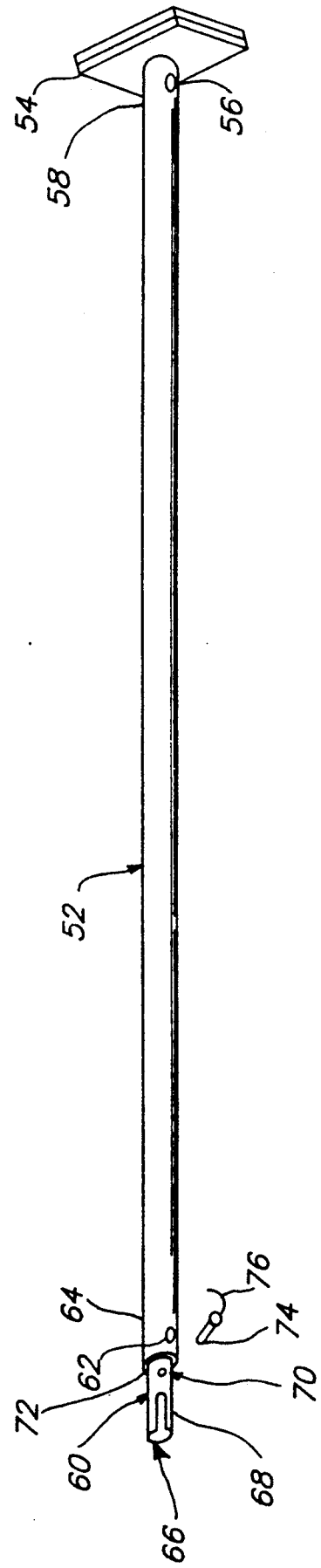
FIG. 3 illustrates an extension member with a foot plate.

FIG. 3 illustrates an extension member 50 including a longitudinal tube 52, a rubber foot plate 54 secured with a nut 56 and bolt 58 to one end of the longitudinal tube 52, a second tube of a lesser diameter 60 is secured within the longitudinal tube 52 with a nut 62 and bolt 64 and including two opposing elongated slots 66 and 68 at the other end, and pin holes 70 and 72 for a pin 74 and a wire hasp 76.

Figure 4:
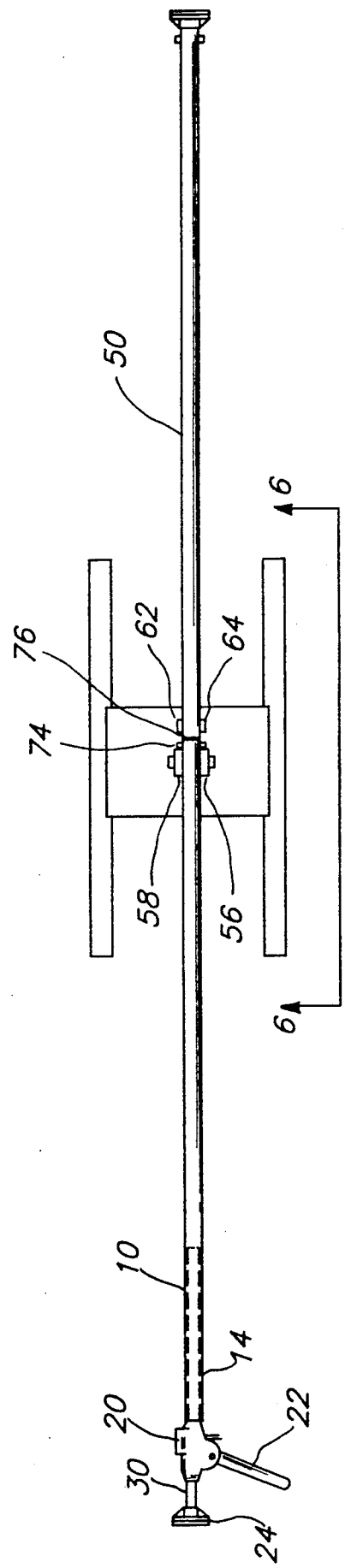
FIG. 4 illustrates a first alternative embodiment of a front view of the load securing system with the extension member.

FIG. 4 illustrates a front view of the load securing system 10 extended with the extension member 50 in a first alternative embodiment such as for extending between the walls of a trailer or a van. The H bar plate is rotated and slid in the elongated slots 66 and 68.

Figure 5:
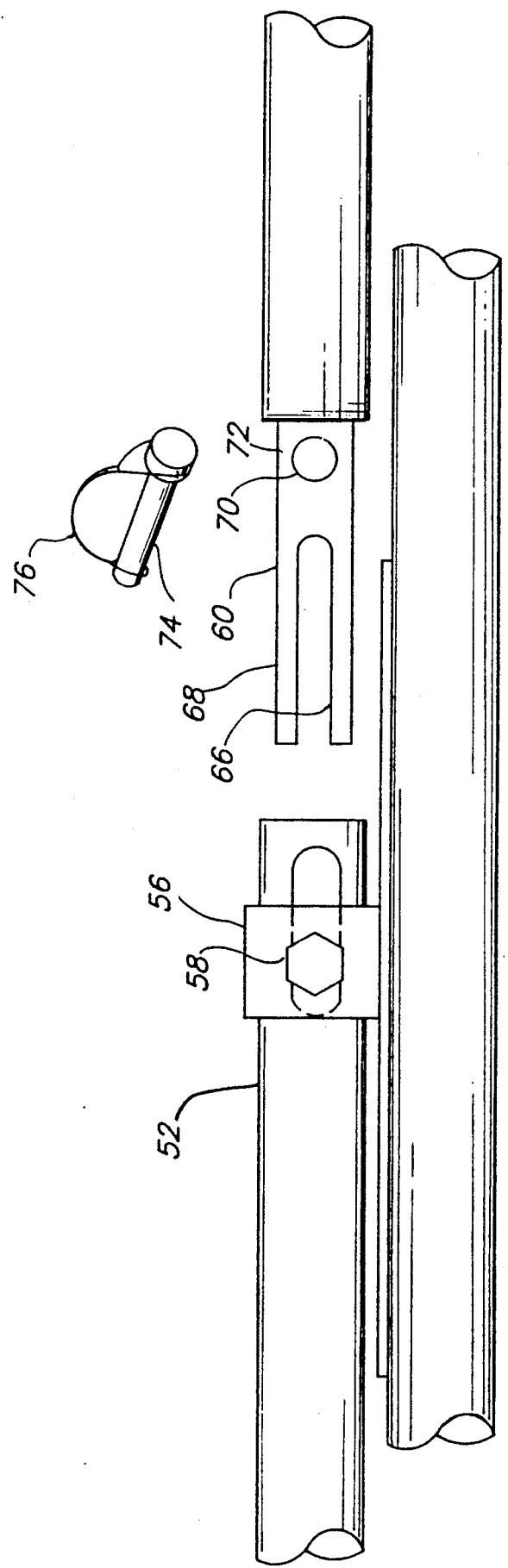
FIG. 5 illustrates an extension member prior to engagement with the load securing system.

FIG. 5 illustrates the extension member prior to engagement with the load securing system. The plate member with the bars is rotated ninety degrees prior to engagement with extension member. All numerals correspond to those elements previously described.

Figure 6:
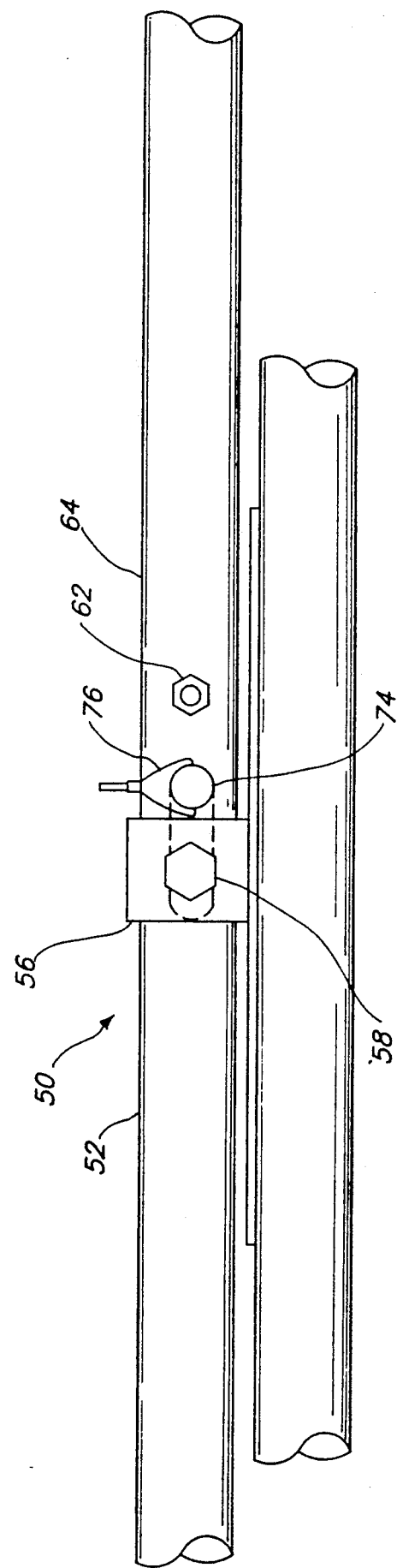
FIG. 6 illustrates the extension member engaged with the load securing system.

FIG. 6 illustrates an assembled view taken along line 6—6 of FIG. 4. Particular attention is drawn to placement of bolt 58, pin 74 and bolt 62. All numerals correspond to those elements previously described.

DESCRIPTION OF THE SECOND ALTERNATIVE EMBODIMENT

Figure 7:
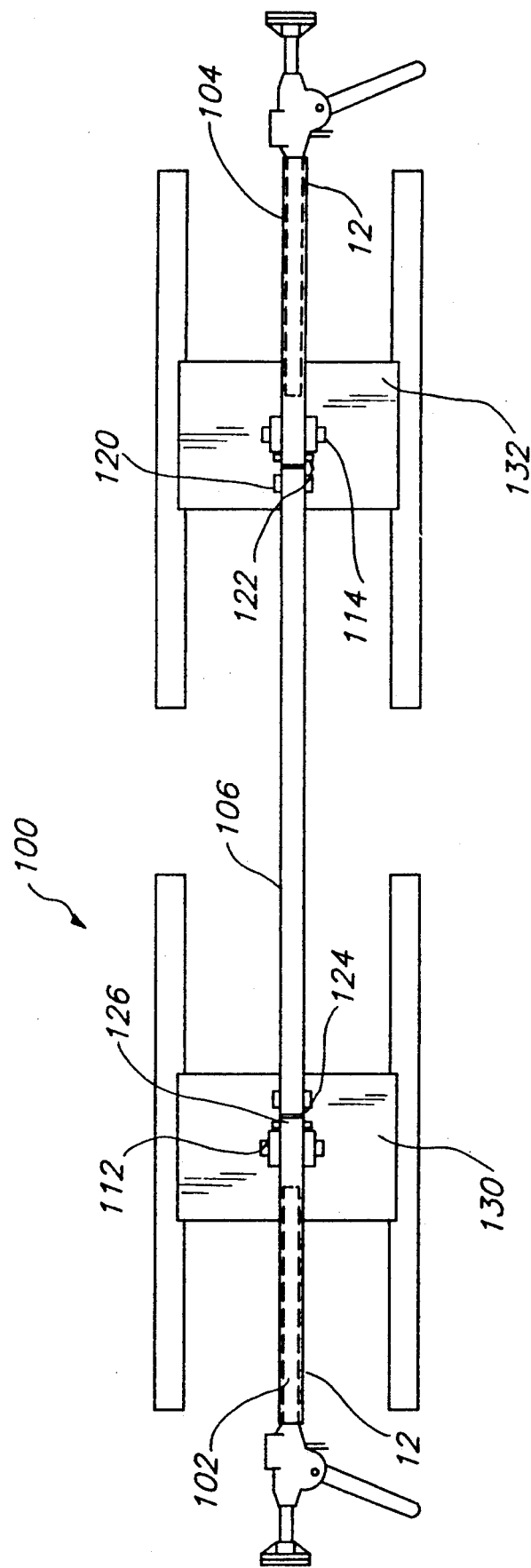
FIG. 7 illustrates a second alternative embodiment of the load securing system with two H-bars and plates between two friction jacks.
Figure 8:
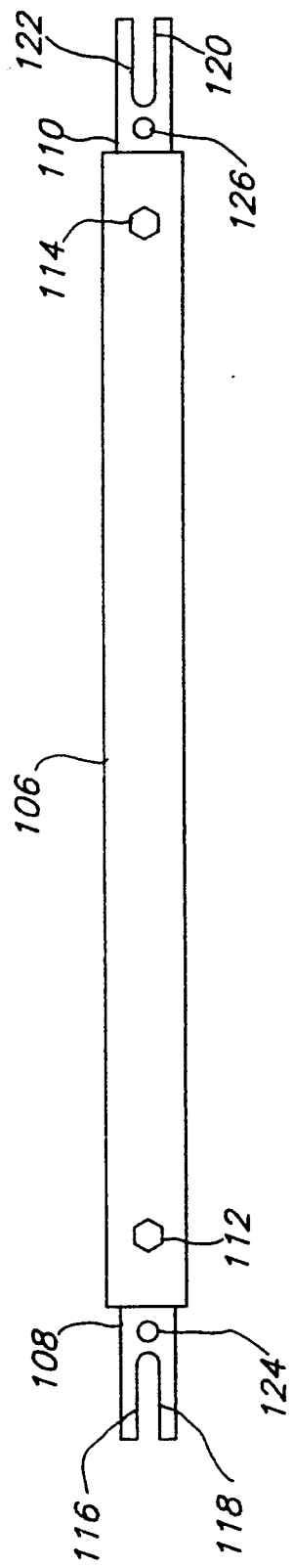
FIG. 8 illustrates a double male extension member.

FIG. 7 illustrates a front view of the second alternative embodiment 100 of the present invention including two load securing systems 102 and 104, and a double male extension member 106. The double male extension member 106 includes two inner tubes 108 and 110, as illustrated in FIG. 8, bolts 112 and 114 securing the inner tubes in position, opposing slots 116, 118, 120 and 122 in each of the inner tubes 108 and 110, of FIG. 8, and pin holes 124 and 126. The left and right load securing system members 130 and 132 are identical to that as previously described in FIGS. 1–6 where the bars and plate are rotated 90 degrees so as to be parallel to the longitudinal member 12, which in this instance is shortened so as to be conveniently positioned between the walls of a trailer, such as a truck trailer.

FIG. 8 illustrates a front view of an extension member where all numerals correspond to those elements previously described. The length of the extension tube can be determined to be appropriate to position a load or loads.

MODES OF OPERATION

The dimensions of the longitudinal members, the bars, the plate, as well as the friction jack can be adjusted accordingly for consumer applications or commercial applications in trailer or vans.

Figure 9:
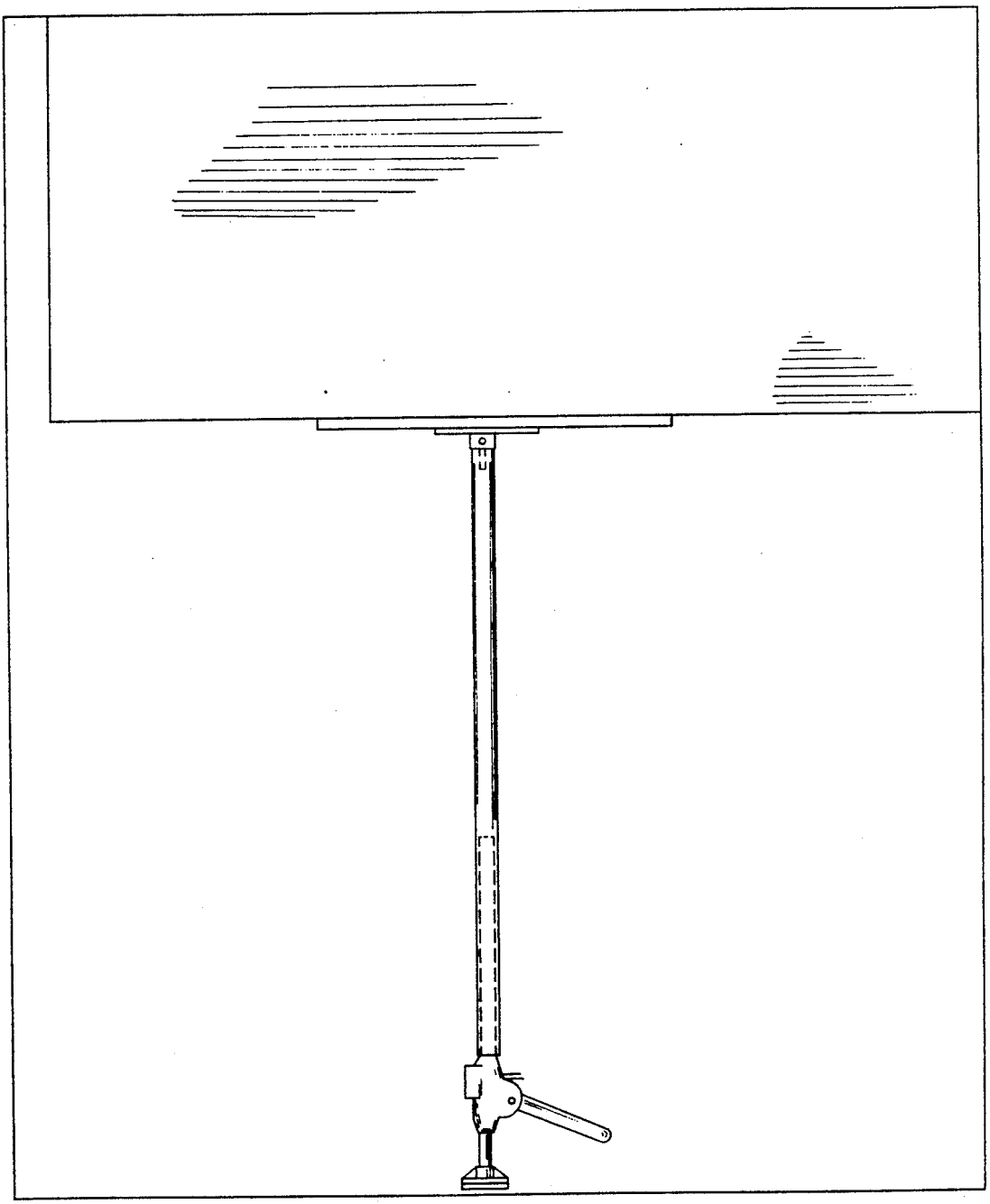
FIG. 9 illustrates the load securing system of FIGS. 1 and 2 singling out a load to one side of the trailer.
Figure 11:
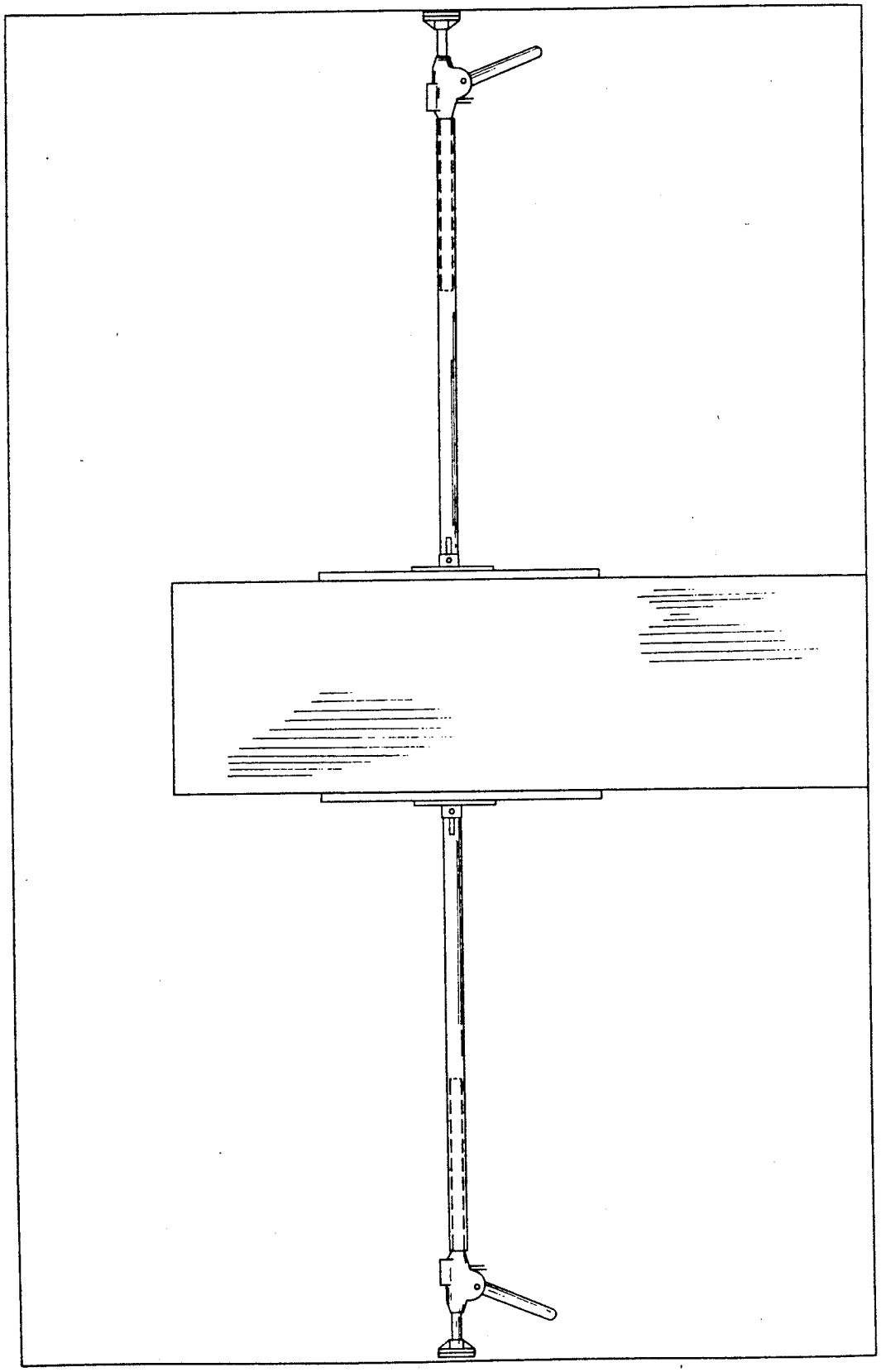
FIG. 11 illustrates the load securing system of FIGS. 1 and 2 singling out and centering a load; and, FIG. 12 illustrates the load securing system of FIGS. 7 and 8 of the second alternative embodiment securing two pallets in a trailer.

FIGS. 9 and 11 are illustrative of one friction jack and one H-bar plate to single out a pallet and load to one side of the trailer, or to hold two pallets and loads in a side-by-side relationship to prevent the pallets from falling towards the rear or the doors of a trailer. When the invention is used to single out a pallet to one side, it is used on the last pallets towards the rear of the trailer or the van.

Figure 10:
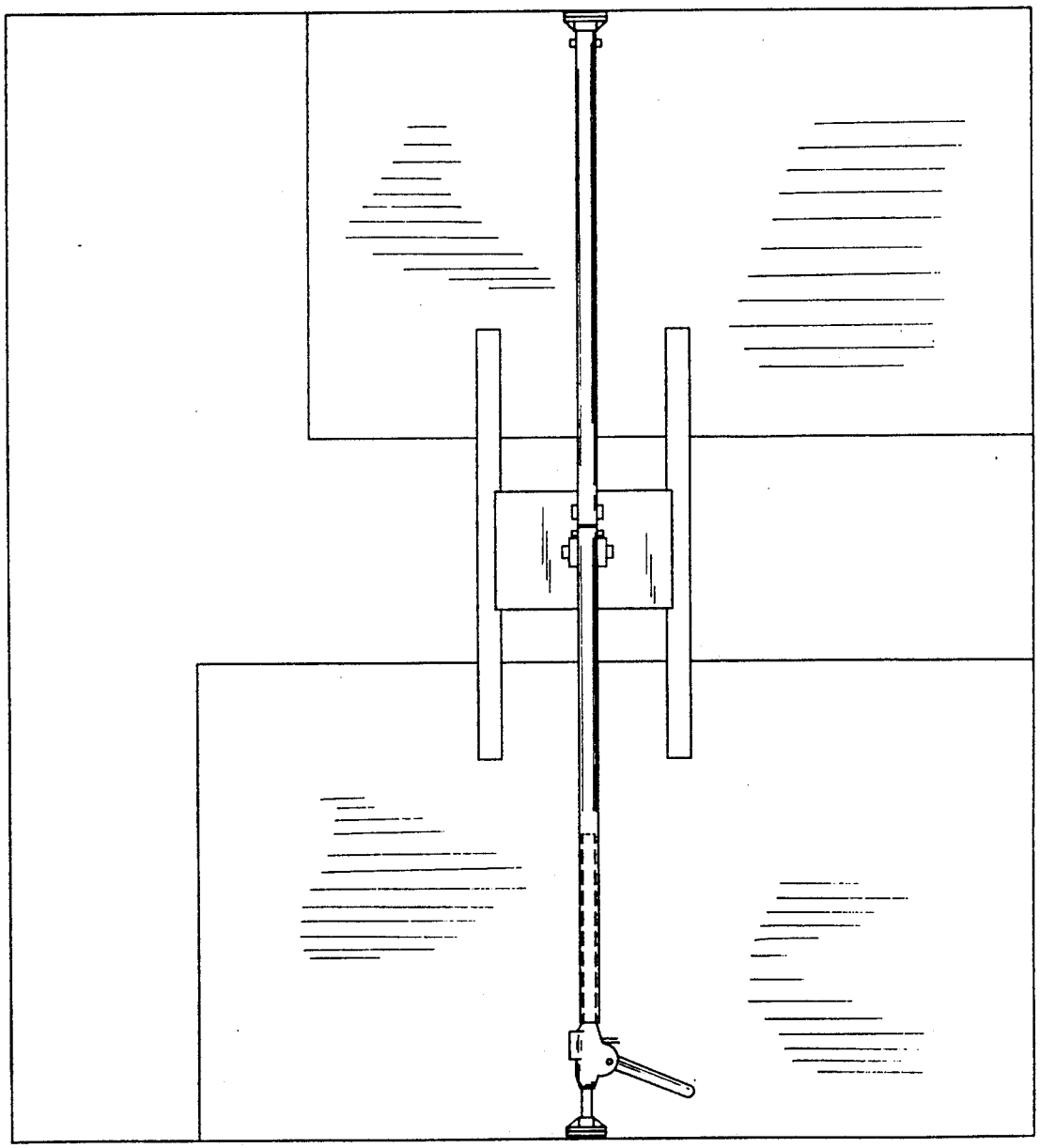
FIG. 10 illustrates the load securing system of FIGS. 3-6 securing two pallets in a trailer.

FIG. 10 is illustrative of one H bar plate with an extension member.

Figure 12:
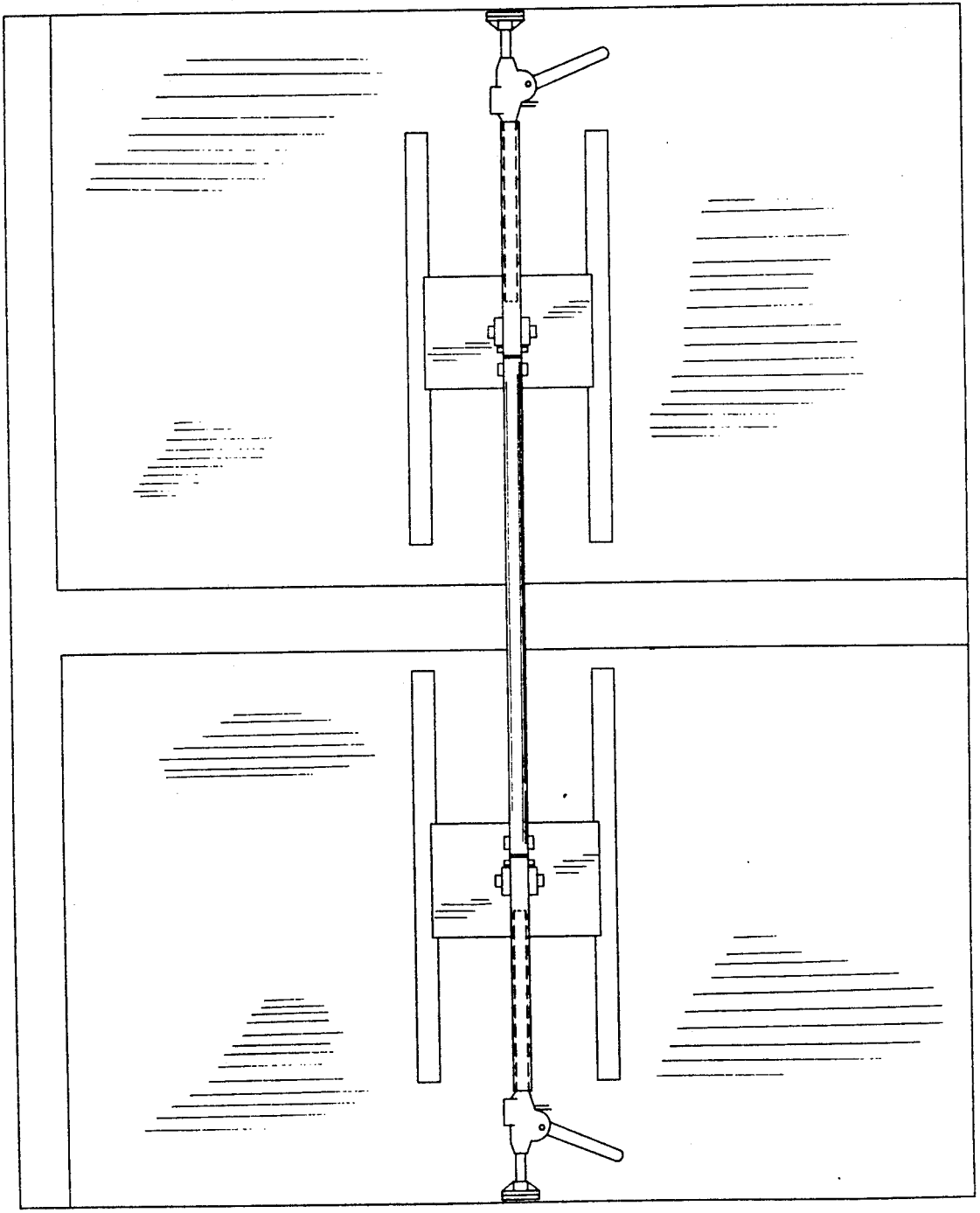

FIG. 12 is illustrative of the second alternative embodiment 100 which includes two friction jacks and two H-bar plates to hold two pallets side-by-side at the rear of the trailer, or in the alternative, without the double male extension member, to hold a pallet in the center of the trailer, such as the front of the trailer or in the nose. If it is used in the nose of a trailer, these two units prevent the next two pallets from falling forward.

Various modifications can be made to the present invention without departing from the apparent scope hereof. The load securing system can also be used in airplanes, or other stationary areas where loads are required to be secured.

I claim:
1. A load securing system comprising:
   a) a longitudinal member with a first end and a second end, a hollow threaded member secured to one of said ends, two opposing elongated holes located in the other one of said ends;
   b) a friction jack attached to said hollow threaded member, a rod mounted in said hollow threaded member with a portion of said rod extending outwardly therefrom, a first foot plate adjustably secured to said outwardly extending portion of said rod, said jack being operatively connected to said rod to extend and retract said first foot plate relative to said hollow member;
   c) two opposing spaced parallel bars, a plate secured at a mid-portion thereof to each of said bars; two opposing spaced tabs extending upwardly from said plate and including opposing holes therein;
   d) first securing means extending through said tabs and said opposing elongated holes in said longitudinal member for rotatably connecting said plate to said longitudinal member;
   e) an extension tube, a smaller mating tube secured to one end of said extension tube, said smaller mating tube including slot means at one end thereof for engaging said first securing means, second securing means for connecting said smaller mating tube, extension tube and longitudinal member in a common longitudinally aligned manner; and
   f) a second foot plate secured to the other end of said extension tube.

* * * * *